US009391678B2

(12) United States Patent
Maltsev et al.

(10) Patent No.: US 9,391,678 B2
(45) Date of Patent: Jul. 12, 2016

(54) MILLIMETER-WAVE COMMUNICATION DEVICE AND METHOD FOR INTELLIGENT CONTROL OF TRANSMIT POWER AND POWER DENSITY

(71) Applicant: Intel Corporation, Santa Clara, CA (US)

(72) Inventors: Alexander Maltsev, Nizhny Novgorod (RU); Ali S. Sadri, San Diego, CA (US); Vadim Sergeyev, Nizhny (RU); Andrey Pudeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/124,648

(22) PCT Filed: Sep. 25, 2013

(86) PCT No.: PCT/US2013/061558
§ 371 (c)(1),
(2) Date: Dec. 6, 2013

(87) PCT Pub. No.: WO2014/175918
PCT Pub. Date: Oct. 30, 2014

(65) Prior Publication Data
US 2015/0085761 A1 Mar. 26, 2015

Related U.S. Application Data

(60) Provisional application No. 61/815,744, filed on Apr. 25, 2013.

(51) Int. Cl.
*H04B 7/04* (2006.01)
*H04W 52/06* (2009.01)
(Continued)

(52) U.S. Cl.
CPC ............ *H04B 7/0452* (2013.01); *H04B 7/0617* (2013.01); *H04W 52/04* (2013.01);
(Continued)

(58) Field of Classification Search
CPC .... H04B 7/0452; H04W 88/08; H04W 52/04; H04W 52/06; H04W 52/18; H04W 52/30
USPC .......................................................... 370/329
See application file for complete search history.

(56) References Cited

U.S. PATENT DOCUMENTS 6,181,278 B1 * 1/2001 Kakimoto et al. ..... 343/700 MS
2006/0030350 A1 * 2/2006 Mitchell ....................... 455/522
(Continued)

FOREIGN PATENT DOCUMENTS

CN 104254981 A 12/2014
EP 2045944 A1 4/2009
(Continued)

OTHER PUBLICATIONS

"International Application Serial No. PCT/US2013/061558, International Search Report mailed Jan. 24, 2014", 3 pgs.
(Continued)

*Primary Examiner* — Warner Wong
(74) *Attorney, Agent, or Firm* — Schwegman Lundberg & Woessner, P.A.

(57) ABSTRACT

Embodiments of a millimeter-wave (mmW) communication device and methods for intelligent control of transmit power and power density are generally described herein. In some embodiments, a mmW base station includes a beamforming processor that is to configure a large-aperture array antenna for multi-beam transmissions at mmW frequencies to a plurality of user equipment (UE). The beamforming processor may allocate each UE a non-interfering spectral portion of a full channel bandwidth that is substantially less than the full channel bandwidth and perform multi-beam beamforming to concurrently direct a plurality of multi-user multiple-input multiple-output (MU-MIMO) antenna beams to the UEs for a concurrent transmission of data streams to the UEs within their allocated spectral portion in accordance with a transmit power allocation.

20 Claims, 3 Drawing Sheets

(51) Int. Cl.
  *H04W 52/18* (2009.01)
  *H04W 52/04* (2009.01)
  *H04W 88/08* (2009.01)
  *H04B 7/06* (2006.01)
  *H04W 52/34* (2009.01)
  *H04W 52/42* (2009.01)

(52) U.S. Cl.
  CPC ............ *H04W 52/06* (2013.01); *H04W 52/18* (2013.01); *H04W 52/346* (2013.01); *H04W 52/42* (2013.01); *H04W 88/08* (2013.01)

(56) References Cited

U.S. PATENT DOCUMENTS

| | | | |
|---|---|---|---|
| 2007/0280237 A1* | 12/2007 | Shin et al. | 370/390 |
| 2007/0286140 A1* | 12/2007 | Kwon | 370/338 |
| 2007/0286188 A1* | 12/2007 | Fan et al. | 370/389 |
| 2008/0075033 A1* | 3/2008 | Shattil | 370/328 |
| 2009/0231225 A1* | 9/2009 | Choudhury et al. | 343/770 |
| 2009/0318183 A1 | 12/2009 | Hugl et al. | |
| 2010/0029212 A1* | 2/2010 | Malladi et al. | 455/63.1 |
| 2010/0056061 A1* | 3/2010 | Luo et al. | 455/63.1 |
| 2011/0182174 A1* | 7/2011 | Pi et al. | 370/229 |
| 2011/0228730 A1* | 9/2011 | Abraham et al. | 370/329 |
| 2012/0120862 A1* | 5/2012 | Mihota et al. | 370/312 |
| 2012/0155447 A1* | 6/2012 | Vermani et al. | 370/338 |
| 2013/0242889 A1* | 9/2013 | Khoryaev et al. | 370/329 |
| 2014/0153500 A1* | 6/2014 | Duan et al. | 370/329 |
| 2014/0247895 A1* | 9/2014 | Shattil | 375/267 |
| 2014/0293870 A1* | 10/2014 | Li et al. | 370/328 |
| 2015/0003343 A1* | 1/2015 | Li et al. | 370/329 |

FOREIGN PATENT DOCUMENTS

| | | |
|---|---|---|
| JP | 2012105321 A | 5/2012 |
| KR | 1020120086300 A | 8/2012 |
| WO | WO-2014175918 A1 | 10/2014 |

OTHER PUBLICATIONS

"International Application Serial No. PCT/US2013/061558, Written Opinion mailed Jan. 24, 2014", 6 pgs.

"International Application Serial No. PCT/US2013/061558, International Preliminary Report on Patentability mailed Nov. 5, 2015", 8 pgs.

* cited by examiner

MILLIMETER-WAVE COMMUNICATION DEVICE AND METHOD FOR INTELLIGENT CONTROL OF TRANSMIT POWER AND POWER DENSITY

PRIORITY CLAIM

This application is a U.S. National Stage Filing under 35 U.S.C. 371 from International Application No. PCT/US2013/061558, filed Sep. 25, 2013, which claims the benefit of priority to U.S. Provisional Patent Application Ser. No. 61/815,744, filed on Apr. 25, 2013, all of which are incorporated herein by reference in their entireties.

TECHNICAL FIELD

Embodiments pertain to wireless communications. Some embodiments relate to millimeter-wave (mmW) communications and beamforming. Some embodiments pertain to wireless personal area networks (WPANs) and wireless local area networks (WLANs) that use millimeter-wave frequencies to communicate. Some embodiments relate to millimeter-wave networks operating in accordance with the wireless gigabit alliance (WiGig) specification and/or the IEEE 802.11ad specification for very-high throughput. Some embodiments relate to cellular communications in accordance with a 3GPP LTE standard.

BACKGROUND

Many wireless communication networks are subject to regulation by various regulation authorities. Such regulations may include limitations on transmission power and limitations on power density. In the United States, the Federal Communication Commission (FCC) is one of the regulatory authorities that set forth such regulations. Issues with wireless communication networks include meeting these limitations on transmission power and power density while providing sufficient throughput and coverage range to simultaneously service a large number of users with minimal transmission delay.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
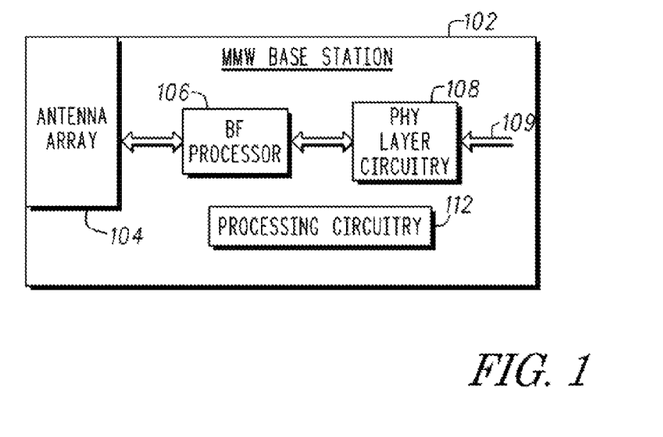
FIG. 1 illustrates a functional block diagram of a mmW base station in accordance with some embodiments.

FIG. 1 illustrates a functional block diagram of an mmW base station 102 in accordance with some embodiments. In some embodiments, the mmW base station 102 may be an enhanced Node B (eNB). In some other embodiments, the mmW base station 102 may be an access point. The mmW base station 102 may include a large-aperture array antenna 104 and beamforming (BF) processor 106 to configure the large-aperture array antenna 104 for multi-beam transmissions at mmW frequencies to a plurality of UEs. The mmW base station 102 may also include physical layer circuitry 108 for generating signals for transmission and processing received signals. The mmW base station 102 may also include processing circuitry 112 to perform the various operations described herein.

In accordance with embodiments, the beamforming processor 106 may be arranged to allocate each UE a non-interfering spectral portion of a full channel bandwidth that is substantially less than the full channel bandwidth, determine a transmit power allocation for each UE, and perform multi-beam beamforming to concurrently direct a plurality of antenna beams to the UEs. The plurality of antenna beams may be configured for concurrent transmission of data streams to the UEs within their allocated spectral portion in accordance with the transmit power allocation.

In some embodiments, the non-interfering spectral portion of the full channel bandwidth may be a small non-interfering spectral portion that is substantially less than the full channel bandwidth. In some embodiments, the small non-interfering spectral portion may be substantially smaller than the full channel bandwidth (e.g., no more than a quarter of the full channel bandwidth, but preferably less than 1/10 of the full channel bandwidth). In some WiGig embodiments that may communicate using the 2 GHz frequency band, the non-interfering spectral portion may be substantially smaller (e.g., 50× or 100× smaller) than the full channel bandwidth.

In some embodiments, the multi-beam transmissions may be space-division multiple access (SDMA) transmissions in accordance with a multi-user (MU) multiple-input multiple-output (MIMO) (MU-MIMO) technique. In some embodiments, the multi-beam transmissions may be also in accordance with a frequency-division multiple access (FDMA) technique. These embodiments are described in more detail below.

In some embodiments, the mmW base station 102 may be arranged to operate in accordance with the WiGig specifications. In some embodiments, the mmW base station 102 may be arranged to operate in accordance with an IEEE 802.1 lad specification.

In some embodiments, the beamforming processor 106 is arranged to allocate a non-interfering spectral portion of the full channel bandwidth to reduce a signal bandwidth for each of the UEs to provide an increase in power spectral density (PSD) for each UE without exceeding a total transmit power ($P_{max}$) limitation, a signal power density ($S_{max}$) limitation or a PSD limitation.

In some embodiments, the large-aperture array antenna 104 may have width and length dimensions that are at least ten times the wavelength of the mmW frequencies used for communicating. This may allow for the generation of very narrow antenna beams as well as the concurrent transmission of multiple antenna beams.

In some embodiments, the beamforming processor may be arranged to allocate the non-interfering spectral portion of the full channel bandwidth to reduce a signal bandwidth for each of the UEs to provide an increase in PSD for each UE without exceeding total transmit power limitation, a signal power density limitation and a PSD limitation. In these embodiments, the beamforming processor may also determine the transmit power allocation for each UE such that a total of the transmit power allocations to the UEs does not exceed the total transmit power limitation for the full channel bandwidth. The beamforming processor may also determine the transmit power allocation for each UE such so that the signal power density of transmissions by any of the antenna beams is below the signal power density limitation. The beamforming processor may also determine the transmit power allocation for each UE such the PSD complies with a transmit spectral mask.

In these embodiments, the total transmit power limitation may be a predetermined number of milliwatts (mW). The signal power density may be specified in terms of power per area at a predetermined distance (e.g., micro-Watts per square centimeter ($uW/cm^2$)). The signal power density is a power density with respect a solid angle in space. The signal power density limitation can be violated too narrow of a beam is generated at a high power. The use of MU-MIMO with multiple beams decreases the signal power density for a given direction. The PSD limitation may be an energy density with respect to frequency. The PSD limitation can be violated if a narrow frequency band is allocated with high transmit power.

In some embodiments, the PSD limitation may be based on a transmit spectrum mask that may be specified for the transmitted spectrum. In some embodiments, the transmit spectrum mask may define the transmit spectrum in dBs relative to a maximum spectral density of the signal.

In some WiGig embodiments, the transmit spectrum may have a 0 dBr (dB relative to the maximum spectral density of the signal) bandwidth not exceeding 1.88 GHz, −20 dBr at a 1.2 GHz offset, −25 dBr at a 1.8 GHz offset, and −30 dBr at a 2.2 GHz offset and above, inside the channels in which the device is transmitting. In these embodiments, the resolution bandwidth may be 1 MHz and the transmit mask may be based on data packets longer than 10 microseconds without training fields.

In some embodiments, mmW base station 102 may be arranged to communicate orthogonal frequency division multiplexed (OFDMA) signals at millimeter-wave frequencies. The OFDMA signals may have a plurality of closely-spaced subcarriers and may be configured with a particular modulation and coding scheme (MCS).

Figure 2A:
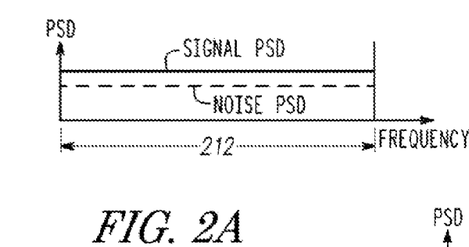
FIG. 2A illustrates signal power spectral density (PSD) and noise PSD for user equipment (UE) that may use the full channel bandwidth for communicating.

FIG. 2A illustrates signal PSD and noise PSD for UE that may use the full channel bandwidth 212 for communicating. Since the signal energy is spread across the full channel bandwidth 212, the signal PSD may not be much greater than the noise PSD.

Figure 2B:
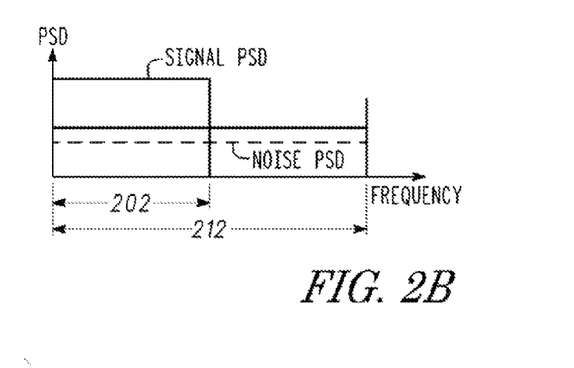
FIG. 2B illustrates signal PSD and noise PSD for a UE that may use less than the full channel bandwidth for communicating in accordance with some embodiments.

FIG. 2B illustrates signal PSD and noise PSD for a UE that may use less than the full channel bandwidth 212 for communicating in accordance with some embodiments. As illustrated in FIG. 2B, by allocating a non-interfering spectral portion 202 of the channel bandwidth 212 that is less than the channel bandwidth 212 (i.e., partial use of the channel bandwidth), the signal bandwidth for a UE is reduced to provide an increase in signal PSD for the UE without an increase in noise PSD. Since the signal energy is spread across a smaller portion of the spectrum (i.e., spectral portion 202), the signal PSD may be much greater than the noise PSD.

Figure 2C:
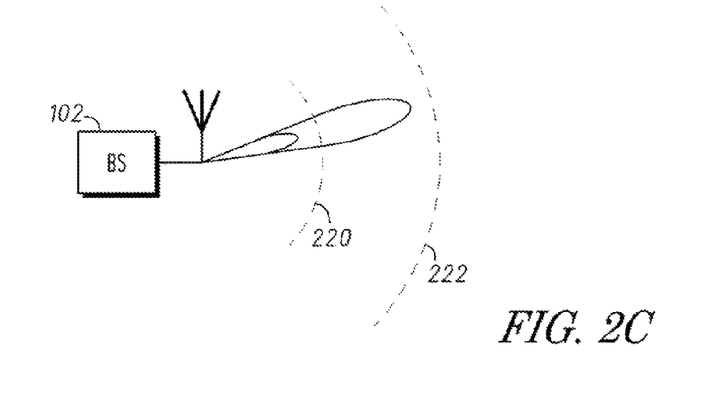
FIG. 2C illustrates an increase in communication range that may be achieved with reduced signal bandwidth in accordance with some embodiments.

FIG. 2C illustrates an increase in communication range that may be achieved with reduced signal bandwidth in accordance with some embodiments. As illustrated in FIG. 2C, a maximum range 220 may be achieved when the full channel bandwidth 212 for communicating, however, an increased maximum range 222 may be achieved with a reduced signal bandwidth.

Figure 3A:
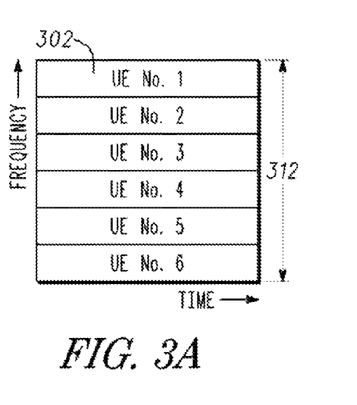
FIG. 3A illustrates the utilization of non-interfering spectral portions in accordance with a frequency division multiple access (FDMA) technique in accordance with some embodiments.
Figure 3B:
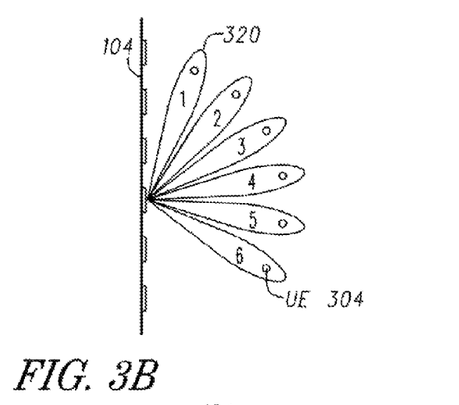
FIG. 3B illustrates concurrent transmission of multiple antenna beams to UEs in accordance with some embodiments.
Figure 3C:
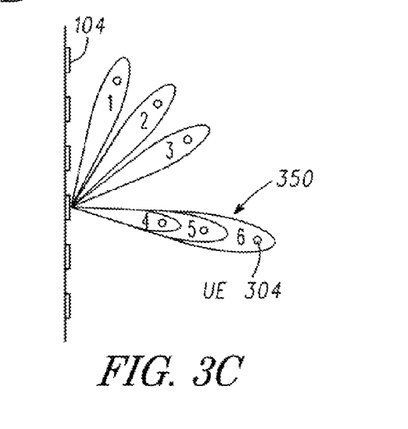
FIG. 3C illustrates concurrent transmission of multiple antenna beams to UEs with some overlapping beams and different transmit power allocations in accordance with some embodiments.

FIG. 3A illustrates the utilization of non-interfering spectral portions in accordance with an FDMA technique in accordance with some embodiments. As illustrated in FIG. 3A, each UE may be allocated a non-interfering spectral portion 302 of the full channel bandwidth 312 for FDMA communications. FIG. 3B illustrates concurrent transmission of multiple antenna beams 304 to UEs 304 in accordance with some embodiments. FIG. 3C illustrates concurrent transmission of multiple antenna beams to UEs 304 with some overlapping beams 350 and different transmit power allocations in accordance with some embodiments.

In the embodiments illustrated in FIGS. 3A and 3B, the beamforming processor 106 (FIG. 1) may be arranged to allocate each UE a non-interfering spectral portion 302 of a channel bandwidth 312 that is substantially less than the channel bandwidth 312. The beamforming processor 106 may also perform multi-beam beamforming to concurrently direct a plurality of MU-MIMO antenna beams 320 to the UEs 304 for a concurrent transmission of data streams to the UEs 304 within their allocated spectral portion in accordance with the transmit power allocation.

In some embodiments, the beamforming processor 106 may also determine the transmit power allocation for each UE such that a total of the transmit power allocations does not exceed the transmit power limitation ($P_{max}$) for the channel bandwidth and the signal power density for transmissions by any of the antenna beams 320 is below the signal power density limitation. For antenna beams that overlap (e.g., antenna beams 350 (FIG. 3C)), the transmit power allocation for a UE may be determined so that the signal power density for transmissions by any of the overlapping antenna beams 350 is below the signal power density limitation. In these embodiments, the transmit power allocation for each UE 304 may also be determined so that the total of the transmit power allocations does not exceed an available transmit power ($P_0$) of the array antenna 104. The beamforming processor 106 may also determine the transmit power allocation for each UE such the PSD complies with a transmit spectral mask.

In some embodiments, the beamforming processor 106 may also determine the transmit power allocation for each UE to maximize a total throughput for the plurality of UEs. In some embodiments, the plurality of UEs may reside in a cell that is serviced by the mmW base station 102. In these embodiments, the beamforming processor 106 may determine the transmit power allocation for each UE to maximize the cell throughput. In some embodiments, the transmit power allocation may also include a transmit power setting to use for communicating with each UE.

In some embodiments, the transmit power limitation is a transmit power limitation of a governmental or regulatory body, such as the FCC. In some embodiments, the signal power density limitation is an FCC maximum allowed signal power density limitation.

Accordingly, by reducing the signal bandwidth several times (i.e., to a small non-interfering spectral portion 302 rather than the entire channel bandwidth) and by transmitting energy in different directions (i.e., within different antenna beams), an increase the PSD may be achieved in a particular direction without exceeding FCC transmit power limitations or FCC signal power density limitations. This may provide for improved communications over greater distances and improved communications under adverse channel conditions. In some embodiments, the FCC transmit power limitation ($P_{max}$) may be 500 milliwatts (mw) and the FCC signal power density limitation ($S_{max}$) may be 18 uW/cm², although other this is not a requirement as the embodiments are equally application to other transmit power and signal power density limitations.

In some example embodiments, the non-interfering spectral portion 302 may comprise one to three physical resource blocks (PRBs) and the channel bandwidth comprises at least fifty PRBs. Each PRB may comprise approximately 40 MHz, although the scope of the embodiments is not limited in this respect. The channel bandwidth may comprise up to 2 GHz. In some embodiments, the non-interfering spectral portion 302 may comprises a number of OFDM subcarriers. Each PRB, for example, may comprise a predetermined number of subcarriers. In some embodiments, a 1024-point FFT may be used for the transmission of OFDM signals that may comprise approximately 20 subcarriers per PRB.

In some embodiments, the processing circuitry 112 (FIG. 1) of the mmW base station 102 may generate instructions to inform each of the UEs of their allocated non-interfering spectral portion 302. In these embodiments, the receiver (i.e., at the UE), may apply filtering to adjust the filtering bandwidth to process downlink signals received from the mmW base station 102 within the reduced signal bandwidth. This provides an increase in SNR at the UE. The filtering bandwidth may equal to the reduced signal bandwidth (i.e., the small non-interfering spectral portion 302). In some LTE embodiments, the downlink signals may be a physical-downlink shared channel (PDSCH) and the instructions may be transmitted in a radio-resource control (RRC) message on a physical-downlink control channel (PDCCH).

In some embodiments, the beamforming processor 106 may be arranged to configure the array antenna 104 to direct one of the antenna beams 320 to each UE based on a current direction each UE (see FIG. 3B). Overlapping antenna beams 350 may be directed to UEs having a same direction. For antenna beams that overlap (e.g., antenna beams 350 of FIG. 3C), the transmit power allocation for a UE is determined so that the signal power density resulting from the overlapping antenna beams 350 is below the signal power density limitation. As illustrated in FIG. 3C, for UEs 304 having the same direction, overlapping antenna beams 350 may be allocated since each UE 304 is allocated a non-interfering spectral portion 302 allowing communications to take place in accordance with an FDMA technique. For example, overlapping antenna beams 350 of FIG. 3C may utilize non-interfering spectral portions 302 for UEs 4, 5 and 6 shown in FIG. 3A. In the example illustrated in FIG. 3B, the power allocation for the antenna beams for all the UEs (UEs 1-6) may be the same. As illustrated in FIG. 3C, UEs #4, #5 and #6 may be located in the same general direction with respect to the large-aperture array antenna 104. In this example, UE #4 may be closer and its antenna may be configured with a lower power setting than for UE #6 which may be further away. In FIG. 3C, the size of an antenna beam 350 is illustrated to reflect the power setting or transmission power (e.g., larger antenna beams correspond to greater transmission power levels).

In some embodiments, the transmit power allocation may be determined based on the channel transfer function with a particular UE, an achievable antenna gain in the direction of the UE and the available transmit power, as well as to maximize total throughput to the UEs. As discussed above, the transmit power allocation for each UE may be determined so that a total of the transmit power allocations does not exceed the transmit power limitation for the channel bandwidth, so that the signal power density for transmissions by any of the antenna beams 320 is below a signal power density limitation, and so that the PSD complies with a transmit spectral mask.

Figure 4A:
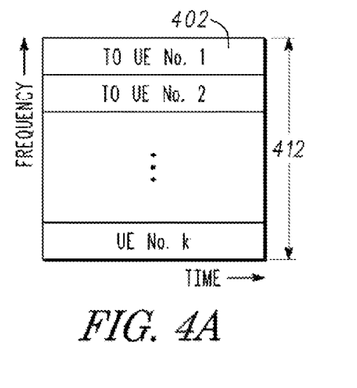
FIG. 4A illustrates concurrent transmission to multiple UEs in physical resource blocks (PRBs) in accordance with an FDMA technique in accordance with some embodiments.

FIG. 4A illustrates concurrent transmission to multiple UEs in PRBs in accordance with an FDMA technique in accordance with some embodiments. In these embodiments, the multi-beam transmissions are configured by the beamforming processor 106 for transmission in accordance with an FDMA technique in which one or more PRBs 402 are allocated to each UE. In these embodiments, the small spectral portion of the channel bandwidth 412 that is allocated to a UE may comprise one or more PRBs 412. Each PRB 402 may, for example, comprise a predetermined number of OFDM subcarriers. In some FDMA/OFDMA embodiments, a PRB 402 may be allocated to a group of two or more UEs.

Figures 4B, 4C:
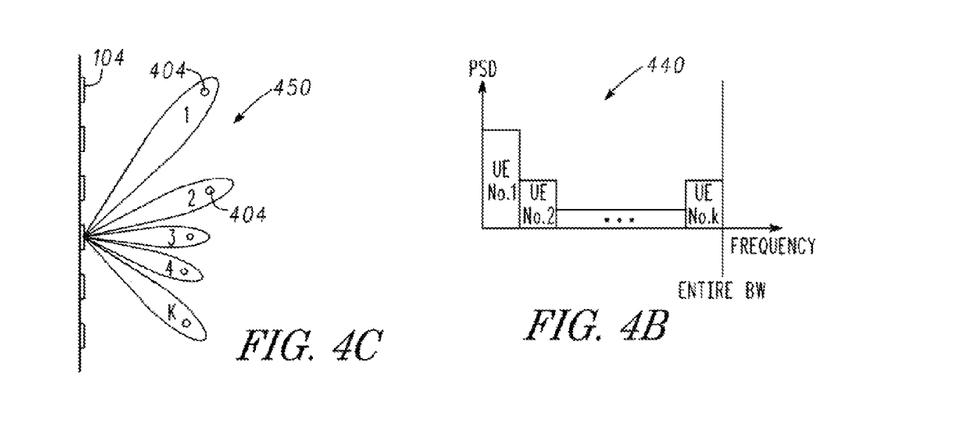
FIG. 4B illustrates concurrent transmission to UEs within the PRBs of FIG. 4A at different transmit power allocations in accordance with some embodiments.
FIG. 4C illustrates concurrent transmission of multiple antenna beams to UEs within the PRBs of FIG. 4A at the different transmit power allocations of FIG. 4B in accordance with some embodiments.

FIG. 4B illustrates concurrent transmission to UEs within the PRBs of FIG. 4A at different transmit power allocations in accordance with some embodiments. In these embodiments, the power allocation 440 for a UE may be based at least in part on one or more of path loss, interference, distance to the UE and a required or desired quality-of-service (QoS) level of the data stream. For example, a greater power allocation may be determined for an individual UE to achieve a higher QoS level and a lower power allocation may be determined for an individual UE to achieve a lower QoS level. For example, a greater power allocation may be determined for an individual UE that is further away, has more path loss or is experiencing greater interference than for a UE that may be closer, has less path loss or may be experiencing less interference.

FIG. 4C illustrates concurrent transmission of multiple antenna beams to UEs within the PRBs of FIG. 4A at the different transmit power allocations of FIG. 4B in accordance with some embodiments. As illustrated in FIG. 4B, a greater power allocation may be determined for UE #1 than for UE #2, lower power allocations may be determined UEs #3-UEs #(k−1), and another power allocation 440 may be determined for UE #k. Corresponding power settings for antennas beams 450 are illustrated in FIG. 4C.

Figure 5A:
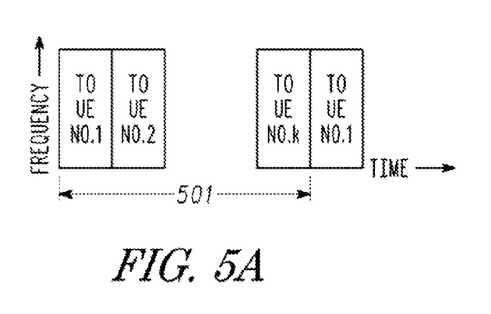
FIG. 5A illustrates non-continuous transmissions to UEs in accordance with a conventional time-division multiple access (TDMA) technique.

FIG. 5A illustrates non-continuous transmissions to UEs in accordance with a conventional TDMA technique. Transmissions to different UEs are conventionally divided in time. For a large number of users (e.g., several hundred), such a TDMA technique leads to bursty traffic and considerable delays for any individual user. As illustrated in FIG. 5A, the physical delay 501 may depend on the number of users.

Figure 5B:
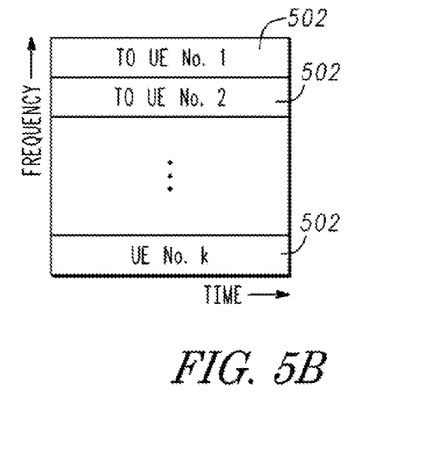
FIG. 5B illustrates continuous transmissions to UEs in accordance with an FDMA technique in accordance with some embodiments.

FIG. 5B illustrates continuous transmissions to UEs in accordance with an FDMA technique in accordance with some embodiments. In these embodiments, the processing circuitry 112 (FIG. 1) may be arranged to concurrently schedule transmissions to the plurality of UEs through the physical-layer circuitry 108 on the non-interfering spectral portions 502 of the channel bandwidth for transmission in accordance with an FDMA technique. In some embodiments, the processing circuitry 112 may be arranged to schedule continuous transmissions to the plurality of UEs through the physical-layer circuitry 108 on the non-interfering spectral portions 502 for transmission in accordance with an FDMA technique. Without using an FDMA technique, transmissions to different UEs would be divided in time, as illustrated in FIG. 5A. The use of FDMA addresses latency and delay issues by distributing the spectrum between the UEs so that each UE may receive data continuously with minimal delay introduced by the physically layer of the transmitting or receiving device. Although a reduced bandwidth may result in a reduced throughput to a particular UE, the throughput may be determined to be sufficient to maintain a desired QoS level.

Figure 6A:
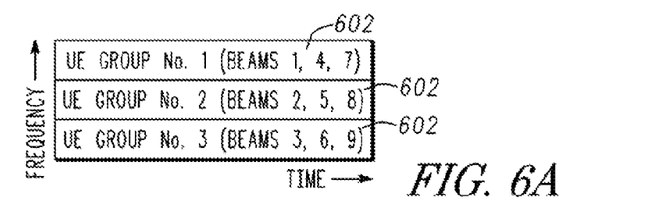
FIG. 6A illustrates the assignment of multi-user multiple-input multiple-output (MU-MIMO) groups of UEs to PRBs in accordance with some embodiments.
Figure 6B:
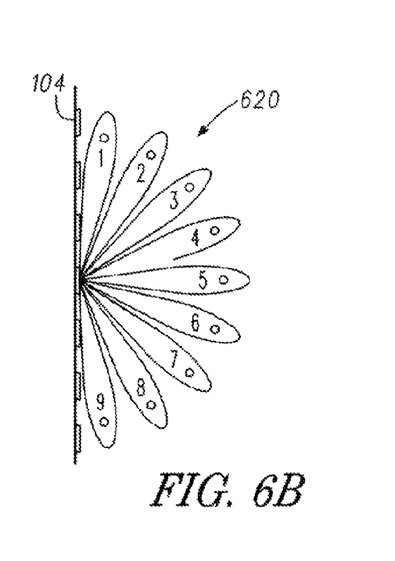
FIG. 6B illustrates concurrent transmission to the UEs of the MU-MIMO groups of FIG. 6A within individual antenna beams in accordance with some embodiments.
Figure 6C:
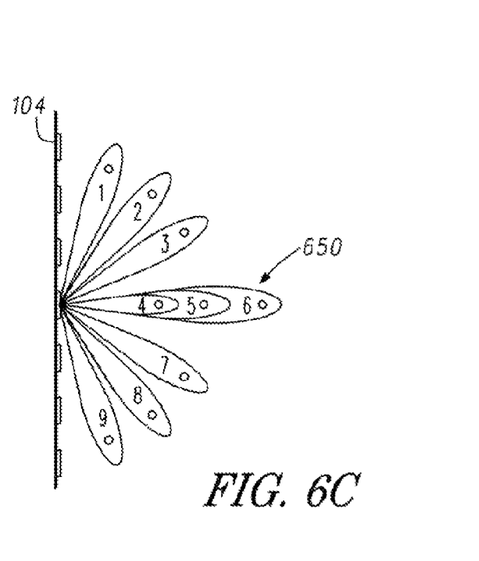
FIG. 6C illustrates concurrent transmission to the UEs of the MU-MIMO groups of FIG. 6A within individual antenna beams, some of which are overlapping, in accordance with some embodiments.

FIG. 6A illustrates the assignment of MU-MIMO groups of UEs to PRBs in accordance with some embodiments. FIG. 6B illustrates concurrent transmission to the UEs of the MU-MIMO groups of FIG. 6A within individual antenna beams in accordance with some embodiments. FIG. 6C illustrates concurrent transmission to the UEs of the MU-MIMO groups of FIG. 6A within individual antenna beams, some of which are overlapping, in accordance with some embodiments.

In these embodiments, the multi-beam transmissions may be configured by the beamforming processor 106 (FIG. 1) in accordance with a MU-MIMO technique. The beamforming processor 106 may assign a MU-MIMO group of UEs to PRB 602 (see FIG. 6A) and generate an OFDMA transmission to each MU-MIMO group. The beamforming processor 106 may also configure the large-aperture array antenna 104 to direct an antenna beam 620 to each of the UEs based on a direction to the UEs (as illustrated in FIG. 6B and FIG. 6C). UEs that have a same direction may be assigned different PRBs.

In the example illustrated in FIG. 6A, UEs of UE group #1 (i.e., UEs 1, 4 and 7) may be assigned a first PRB, UEs of UE group #2 (i.e., UEs 2, 5 and 8) may be assigned a second PRB, and UEs of UE group #3 (i.e., UEs 3, 6 and 9) may be assigned a third PRB. As illustrated in FIG. 6B, the beamforming processor 106 may configure the large-aperture array antenna 104 to direct an antenna beam 620 to each of the UEs. As illustrated in FIG. 6C, UEs 4, 5 and 6 may be located in the same direction and are assigned different PRBs so that their antenna beams 650 do not interfere in frequency.

In these embodiments, the OFDMA transmission to a MU-MIMO group of UEs may utilize the same set of OFDM subcarriers and may be configured in accordance with a MU-MIMO technique. In other words, a data stream for each UE may be provided in the OFDMA transmission to the UEs of a MU-MIMO group that is sharing a PRB. The UEs of a MU-MIMO group may utilize MU-MIMO processing to decode their intended data stream.

In the example illustrated in FIG. 6B, the power settings for the antenna beams for all the UEs (UEs 1-9) may be the same. In the example illustrated in FIG. 6C, the power settings for the antenna beams for some the UEs (UEs 1-3, 5 and 7-9) may be the same, a greater power setting may be determined for UE #6, and a lower power setting may be determined for UE #4.

In this example, UE #4 is illustrated as being closer to the large-aperture array antenna 104 thus having a lower power setting than that of UE #6, however as described above, various factors may be used to determine the power allocation and power setting for a UE's antenna beam.

In some embodiments, the large-aperture array antenna 104 may comprise a plurality of antenna modules. Each module may comprise a sub-array and may include an RF beamforming unit coupled to the beamforming processor 106. In these embodiments, the large-aperture array antenna 104 may be a very large aperture modular array antenna (MAA). In these embodiments, the beamforming processor 106 configures the RF beamforming unit to generate a plurality of antenna beams as described herein. The physical size of the antenna array may be very large (i.e., >10×) in comparison with the wavelength allowing for the generation of very narrow beams and/or multiple narrow beams simultaneously.

In some WiGig embodiments, the mmW base station 102 may be configurable to communicate within the 60 GHz frequency band with individual UEs utilizing the full channel bandwidth. In these embodiments, the full channel bandwidth may be a 2 GHz wide bandwidth. In these embodiments, the mmW base station is arranged to instruct the UEs to refrain from utilizing the full 2 GHz channel bandwidth when allocating a non-interfering spectral portion of the full channel bandwidth to a UE and communicate with the UEs within this reduced signal bandwidth.

In these embodiments, the total transmit power limitation and the maximum signal power density at a predetermined distance may correspond to FCC requirements (e.g., for the millimeter wave band of 59.05 to 64 GHz, 500 mW max and 18 uW/cm$^2$ measured at three meters away from the antenna). In some embodiments, the millimeter-wave frequencies utilized by the mmW base station 102 to communicate with UEs may be in the 60 GHz band (V-band), but may range from 30 GHz to up to 70 GHz or more.

In some embodiments, the PHY layer circuitry 108 (FIG. 1) may receive baseband signals 109 from a baseband processor. The baseband signals may represent a data stream for each of the UEs. The data streams that are transmitted may comprise individually addressed data packets.

In some LTE embodiments, a PRB may comprise 12 subcarriers in the frequency domain×0.5 ms in the time domain. The PRBs may be allocated in pairs (in the time domain). In these embodiments, the PRB may comprise a plurality of resource elements (REs). A RE may comprise one sub-carrier×one symbol.

In some embodiments, an intelligent MU-MIMO beam power control technique is provided to optimize the MU-MIMO throughput performance of a station equipped with a large aperture antenna array subject to regulation (e.g., FCC) limitations on total transmitted power and on a peak power density of the emissions. In these embodiments, the joint use of spatial division (SDMA or MU-MIMO) and frequency division (FDMA or OFDMA) techniques create a very flexible and powerful system for millimeter wave band communications. The embodiments include several approaches to exploit the frequency division dimension (in addition to MU-MIMO or SDMA) to improve various system performance characteristics such as the aggregate throughput, the coverage range, the number of users simultaneously served by an access point or base station, etc. For example, a number of users simultaneously served by mmW base station 102 may reach several hundreds and more, while each UE may receive 10+ Mbps throughput with the delay under 1 millisecond. This may be achieved within the FCC limitations on total transmit power and signal power density of the base station's emissions.

As discussed above, some embodiments may jointly use the SDMA (MU-MIMO) and FDMA techniques in the mmW band. In these FDMA embodiments, the signal spectrum may be divided into parts, and a different part may be assigned to same or different users. In some embodiments, the spectrum is divided into several parts having equal bandwidth. For example, with OFDM modulation, the entire set of OFDM subcarriers may be split into several subsets of equal size and the subsets may be allocated to the same or different UEs. A minimal subset of subcarriers that can be assigned to one user may be one PRB.

In some FDMA and OFDMA embodiments, a single UE may be served using only in a part of spectrum. This property may be effectively used in many ways; one way is to communicate to very remote users that otherwise would fall out of base station coverage range because of limitations on overall transmit power or signal power density of the base station. In the absence of interference, the connectivity between two stations may be determined by the ability of one station to create the SNR at the receiver of the other station above a threshold (which depends on the modulation and coding scheme (MCS) the stations use to communicate). The received SNR in turn depends on the transmitted power, the path loss (reduction of the signal power with the distance), and the noise power at the receiver. Another observation is that the receiver noise power is proportional to the frequency bandwidth of the signal the stations use to communicate. Therefore by reducing the signal bandwidth several times and preserving the total transmit power, a similar increase of the SNR at the receiver may be achieved without altering the transmit power or the transmit beamforming settings solely due to reduction of the received noise power.

This may be also explained in terms of PSD (PSD), which is the ratio of the signal (noise) power to the frequency bandwidth of the signal (noise). Since the receiver applies filtering of the signal, the filtering bandwidth being equal to the signal bandwidth (to filter out all unwanted signals lying out of the useful signal frequency band), the SNR may be viewed as the ratio of the PSD of the signal to the PSD of the noise. For OFDM and OFDMA systems, this value measured for one subcarrier may also be referred to as SNR per subcarrier. For example, if the entire 2 GHz spectrum is used to communicate with only one user, the maximum allowed PSD of the signal is determined by the maximum allowed power, which in turn is determined by total transmit power limitation or signal power density limitation (illustrated in FIG. 2A). With the partial use of spectrum, greater PSD may be achieved with the same overall transmit power (illustrated in FIG. 2B). Consequently, the filter at the receiver (e.g., the UE) may be tuned to process signals within the reduced signal bandwidth. The SNR (i.e., equal to the ratio of signal PSD to noise PSD) also increases and therefore communication may be established over greater distances (illustrated in FIG. 2C) without violation of the FCC requirements.

As already mentioned, FDMA or OFDMA techniques allow the base station 102 to allocate different parts of signal spectrum to different users (illustrated in FIG. 3A). In some embodiments, different BF settings may be applied for different parts of signal spectrum. For example, with a modular antenna array, different fine beamforming settings may be applied by the beamforming processor 106. Several beams may be created in different directions and serve multiple users simultaneously even if the beamforming processor does not support MU-MIMO (illustrated in FIG. 3B).

When multiple beams are created as just described, the energy emitted by the antenna is spread over greater angle than it would be if entire bandwidth was allocated to single user (i.e., with one BF setting across the entire spectrum). In this way the transmission scheme may reduce the power density and therefore allow the mmW base station 102 more room to increase power to serve the users within the FCC's signal power density, provided that total transmit power limitation can be met. Therefore greater ranges or greater throughputs may be achieved by the mmW base station 102 within the limits of FCC requirements (e.g., $P_{max}$=500 mW and $S_{max}$=18 uW/cm2). In other situations some of the beams transmitted in different frequency parts may be directed in the same direction to simultaneously serve several users located substantially in the same direction with respect to the mmW base station 102 (illustrated in FIG. 3C). This does not create interference between transmissions to different users since they are separated (orthogonal) in frequency domain.

Note also that different users may receive different power allocations in frequency domain (e.g. to compensate for different path loss between them and the mmW base station 102). This is illustrated in FIGS. 4A, 4B and 4C.

Some millimeter wave communication systems may use a lot of spectrum at once to communicate at very high throughput. For example, the bandwidth of a single channel of WiGig link may be as wide as 2 GHz, with the data rate achieving 7 Gbps. However, for realistic applications (including standard compressed video streaming) this throughput is often not needed and may be used by the mmW base station 102 to serve several users simultaneously. If not using the FDMA in accordance with some embodiments, transmissions to different users have to be divided in time domain for TDMA mode communications. For a large number of users (e.g. several hundreds), using a TDMA mode leads to bursty traffic and considerable delays in the traffic for each individual user. The FDMA embodiments disclosed herein address these issues by distributing the spectrum between the users so that each user obtains reduced throughput (though still enough to maintain the required QoS level), but receives the data continuously with minimal delay introduced by the physical layer of the wireless communication system. The delay performances of a communication system for the cases with and without FDMA are illustrated in FIGS. 5A and 5B.

FDMA and/or OFDMA techniques may be used in combination with SDMA (MU-MIMO) to substantially increase the number of users simultaneously served by the mmW base station 102. This may be done by assigning groups of users to different PRBs, each group being served in MU-MIMO mode (i.e. via multiple beams). For example, if the number of MU-MIMO beams the array antenna 104 can create is three, and the signal may be divided into three PRBs, total number of users served by the mmW base station 102 may be nine as shown in FIGS. 6A, 6B and 6C. In some embodiments, the number of PRBs and the number of MU-MIMO beams may be much more (e.g. 50 PRBs in LTE-like systems and 16 MU-MIMO beams); therefore the number of simultaneously served users may be up to 800 or more. It should be noted that MU-MIMO beams created in different PRBs may be pointing in different directions as shown in FIG. 6B or may have at least some of the beams overlapping as shown in FIG. 6C. In this scheme overlapping of the beams transmitted in different PRBs (e.g. beams 4, 5, 6) does not create interference between transmissions to corresponding users since they are separated in the frequency domain. For example beams 4, 5 and 6 may point to the same direction while serving different users with no inter-beam interference problems.

In some embodiments, a UE may be a mobile or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE may include one or more of a keyboard, a display, a non-volatile memory port, multiple antennas, a graphics processor, an application processor, speakers, and other mobile device elements. The display may be an LCD screen including a touch screen.

Although the mmW base station 102 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the mmW base station 102 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the mmW base station 102 may include one or more processors and may be configured with instructions stored on a computer-readable storage device.

In one example, a millimeter-wave (mmW) base station comprises a beamforming processor to configure a large-aperture array antenna for multi-beam transmissions at mmW frequencies to a plurality of user equipment (UE), wherein the beamforming processor is arranged to allocate each UE a non-interfering spectral portion of a full channel bandwidth that is substantially less than the full channel bandwidth, determine a transmit power allocation for each UE, and perform multi-beam beamforming to concurrently direct a plurality of multi-user multiple-input multiple-output (MU-MIMO) antenna beams to the UEs for a concurrent transmission of data streams to the UEs within their allocated non-interfering spectral portion in accordance with the transmit power allocation.

In another example, the mmW base station is configurable to operate in accordance with a Wireless Gigabit Alliance (WiGig) specification in which communications are to take place within a 60 GHz frequency band with each UE utilizing the full channel bandwidth, the full channel bandwidth being a 2 GHz wide bandwidth, and wherein the mmW base station is arranged to instruct the UEs to refrain from utilizing the full channel bandwidth when allocated a non-interfering spectral portion, and communicate with the UEs within the allocated non-interfering spectral portion instead of the full channel bandwidth.

In another example, the beamforming processor is arranged to allocate the non-interfering spectral portion of the full channel bandwidth to reduce a signal bandwidth for each of the UEs to provide an increase in power spectral density (PSD) for each UE without exceeding total transmit power (Pmax) limitation, a signal power density (Smax) limitation and a PSD limitation, and wherein the large-aperture array antenna has width and length dimensions that are at least ten times a wavelength of the mmW frequencies.

In another example, the beamforming processor is further arranged to determine the transmit power allocation for each UE such that a total of the transmit power allocations does not exceed the total transmit power limitation for the full channel bandwidth, a signal power density for transmissions by any of the antenna beams is below the signal power density limitation, and a PSD complies with a transmit spectral mask.

In another example, the beamforming processor is further arranged to determine the transmit power allocation for each UE to maximize a total throughput for the plurality of UEs.

In another example, the transmit power limitation is an transmit power limitation set by a federal communication commission (FCC), wherein the signal power density limitation is a maximum allowed signal power density limitation set by the FCC, and wherein the PSD complies with a transmit spectral mask that sets a maximum spectral density.

In another example, the non-interfering spectral portion comprises one to three physical resource blocks (PRBs) and the full channel bandwidth comprises at least fifty PRBs, each PRB comprising a same number of orthogonal-frequency division multiplexed (OFDM) subcarriers.

In another example, processing circuitry may generate instructions to inform each of the UEs which non-interfering spectral portion of the full channel bandwidth has been allocated, the instructions arranged for transmission in a radio-resource control (RRC) message.

In another example, the beamforming processor is arranged to cause the array antenna to direct one of the MU-MIMO antenna beams to each UE based on a current direction each UE, and wherein overlapping antenna beams are directed to UEs having a same direction.

In another example, the multi-beam transmissions are configured by the beamforming processor in accordance with a frequency-division multiple access (FDMA) technique in which one or more non-interfering physical resource blocks (PRBs) are allocated to each UE.

In another example, the beamforming processor is further arranged to assign a MU-MIMO group of UEs to a physical resource block (PRB), generate an OFDMA transmission to each MU-MIMO group of UEs, and configure the large-aperture array antenna to direct an antenna beam to each of the UEs based on a direction to the UEs, wherein UEs that have a same direction are assigned different PRBs.

In another example, the transmit power allocation for each UE is based at least in part on one or more of path loss, interference, distance to the UE and a quality-of-service (QoS) level.

In another example, a method for multi-user multiple-input multiple-output (MU-MIMO) performed by a millimeter-wave (mmW) base station comprises configuring a large-aperture array antenna for multi-beam transmissions at mmW frequencies to a plurality of user equipment (UE), allocating each UE a non-interfering spectral portion of a full channel bandwidth that is substantially less than the full channel bandwidth, and performing multi-beam beamforming to concurrently direct a plurality of MU-MIMO antenna beams to the UEs for a concurrent transmission of data streams to the UEs within their allocated spectral portion in accordance with a transmit power allocation.

In another example, the mmW base station is arranged to instruct the UEs to refrain from utilizing the full channel bandwidth when allocating a non-interfering spectral portion, and communicate with the UEs within the allocated non-interfering spectral portion instead of the full channel bandwidth.

In another example, allocating the non-interfering spectral portion of the full channel bandwidth reduces a signal bandwidth for each of the UEs to provide an increase in power spectral density (PSD) for each UE without exceeding total transmit power (Pmax) limitation, a signal power density (Smax) limitation and a PSD limitation, and wherein the large-aperture array antenna has width and length dimensions that are at least ten times a wavelength of the mmW frequencies.

In another example, the method includes determining the transmit power allocation for each UE such that a total of the transmit power allocations does not exceed the total transmit power limitation for the full channel bandwidth, a signal power density for transmissions by any of the antenna beams is below the signal power density limitation, and a PSD complies with a transmit spectral mask.

In another example, a millimeter-wave (mmW) base station comprises a large-aperture array antenna, and a beamforming processor to configure the large-aperture array antenna for multi-beam transmissions at mmW frequencies to a plurality of user equipment (UE), wherein the beamforming processor is arranged to allocate each UE a non-interfering spectral portion of a full channel bandwidth that is substantially less than the full channel bandwidth, instruct the UEs to refrain from utilizing the full channel bandwidth when allocated a non-interfering spectral portion, determine a transmit power allocation for each UE, and perform multi-beam beamforming to concurrently direct a plurality of multi-user multiple-input multiple-output (MU-MIMO) antenna beams to the UEs for a concurrent transmission of data streams to the UEs within their allocated non-interfering spectral portion in accordance with the transmit power allocation.

In another example, the mmW base station is configurable to operate in accordance with a Wireless Gigabit Alliance (WiGig) specification in which communications are to take place within a 60 GHz frequency band with each UE utilizing the full channel bandwidth, the full channel bandwidth being a 2 GHz wide bandwidth, and wherein the mmW base station is arranged to communicate with the UEs within the allocated non-interfering spectral portion instead of the full channel bandwidth.

In another example, the beamforming processor is arranged to allocate the non-interfering spectral portion of the full channel bandwidth to reduce a signal bandwidth for each of the UEs to provide an increase in power spectral density (PSD) for each UE without exceeding total transmit power (Pmax) limitation, a signal power density (Smax) limitation and a PSD limitation, and determine the transmit power allocation for each UE such that a total of the transmit power allocations does not exceed the total transmit power limitation for the full channel bandwidth, a signal power density for transmissions by any of the antenna beams is below the signal power density limitation, and a PSD complies with a transmit spectral mask.

In another example, a non-transitory computer-readable storage medium that stores instructions for execution by one or more processors to perform operations for multi-user multiple-input multiple-output (MU-MIMO) beamforming is provided.

The operations comprise configuring a large-aperture array antenna for multi-beam transmissions at mmW frequencies to a plurality of user equipment (UE), allocating each UE a non-interfering spectral portion of a full channel bandwidth that is substantially less than the full channel bandwidth, and configuring the large-aperture array antenna to perform multi-beam beamforming to concurrently direct a plurality of MU-MIMO antenna beams to the UEs for a concurrent transmission of data streams to the UEs within their allocated spectral portion in accordance with a transmit power allocation.

In another example, the operations further comprise allocating the non-interfering spectral portion of the full channel bandwidth to reduce a signal bandwidth for each of the UEs to provide an increase in power spectral density (PSD) for each UE without exceeding total transmit power (Pmax) limitation, a signal power density (Smax) limitation and a PSD limitation, and determining the transmit power allocation for each UE such that a total of the transmit power allocations does not exceed the total transmit power limitation for the full channel bandwidth, a signal power density for transmissions by any of the antenna beams is below the signal power density limitation, and a PSD complies with a transmit spectral mask.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A beamforming processor to configure a large aperture array antenna of a base station for communication at millimeter-wave (mmW) frequencies, within a 60 GHz frequency band, with a plurality of user equipment (UE), the beamforming processor configured to:
   allocate each UE a non-interfering spectral portion of a full channel bandwidth, the full channel bandwidth being 2 GHz wide;
   determine a transmit power allocation for each UE for use within the allocated portion of bandwidth to increase power spectral density (PSD) for each UE within the allocated portion of bandwidth, the transmit power allocation based on a total transmit power (Pmax) limitation, a signal power density (Smax) limitation and a PSD limitation;
   perform multi-beam beamforming to concurrently direct a plurality of multi-user multiple-input multiple-output (MU-MIMO) antenna beams to the UEs for a concurrent transmission of data streams to the UEs within their allocated non-interfering spectral portion in accordance with the transmit power allocation;
   instruct the UEs to refrain from utilizing the full channel bandwidth when allocated a non-interfering spectral portion; and
   communicate with the UEs within the allocated non-interfering spectral portion instead of the full channel bandwidth.

2. The beamforming processor or claim 1 wherein the base station is configurable to operate in accordance with a Wireless Gigabit Alliance (WiGig) specification.

3. A beamforming processor to configure a large aperture array antenna of a base station for communication at millimeter-wave (mmW) frequencies with a plurality of user equipment (UE), the beamforming processor configured to:
- allocate each UE a non-interfering spectral portion of a full channel bandwidth;
- determine a transmit power allocation for each UE; and
- perform multi-beam beamforming to concurrently direct a plurality of multi-user multiple-input multiple-output (MU-MIMO) antenna beams to the UEs for a concurrent transmission of data streams to the UEs within their allocated non-interfering spectral portion in accordance with the transmit power allocation,
  - wherein the beamforming processor is arranged to allocate the non-interfering spectral portion of the full channel bandwidth to reduce a signal bandwidth for each of the UEs to provide an increase in power spectral density (PSD) for each UE without exceeding total transmit power (Pmax) limitation, a signal power density (Smax) limitation and a PSD limitation, and
  - wherein the large-aperture array antenna has width and length dimensions that are at least ten times a wavelength of the mmW frequencies.

4. The beamforming processor or claim 3 wherein the beamforming processor is further arranged to determine the transmit power allocation for each UE such that:
- a total of the transmit power allocations does not exceed the total transmit power for the full channel bandwidth,
- a signal power density for transmissions by any of the antenna beams is below the signal power density limitation, and
- a PSD complies with a transmit spectral mask.

5. The beamforming processor or claim 4 wherein the beamforming processor is further arranged to determine the transmit power allocation for each UE to maximize a total throughput for the plurality of UEs.

6. The beamforming processor or claim 4 wherein the transmit power limitation is an transmit power limitation set by a federal communication commission (FCC),
- wherein the signal power density limitation is a maximum allowed signal power density limitation set by the FCC, and
- wherein the PSD complies a transmit spectral mask that sets a maximum spectral density.

7. The beamforming processor or claim 4 wherein the non-interfering spectral portion comprises one to three physical resource blocks (PRBs) and the full channel bandwidth comprises at least fifty PRBs, each PRB comprising a same number of orthogonal-frequency division multiplexed (OFDM) subcarriers.

8. The beamforming processor or claim 4 further comprising processing circuitry to generate instructions to inform each of the UEs which non-interfering spectral portion of the full channel bandwidth has been allocated, the instructions arranged for transmission in a radio-resource control (RRC) message.

9. The beamforming processor or claim 4 wherein the beamforming processor is arranged to cause the array antenna to direct one of the MU-MIMO antenna beams to each UE based on a current direction each UE, and
- wherein overlapping antenna beams are directed to UEs having a same direction.

10. The beamforming processor or claim 4 wherein the multi-beam transmissions are configured by the beamforming processor in accordance with a frequency-division multiple access (FDMA) technique in which one or more non-interfering physical resource blocks (PRBs) are allocated to each UE.

11. The beamforming processor or claim 4 wherein the beamforming processor is further arranged to:
- assign a MU-MIMO group of UEs to a physical resource block (PRB),
- generate an OFDMA transmission to each MU-MIMO group of UEs; and
- configure the large-aperture array antenna to direct an antenna beam to each of the UEs based on a direction to the UEs,
- wherein UEs that have a same direction are assigned different PRBs.

12. The beamforming processor or claim 5 wherein the transmit power allocation for each UE is based at least in part on one or more of path loss, interference, distance to the UE and a quality-of-service (QoS) level.

13. A method for multi-user multiple-input multiple-output (MU-MIMO) communications at millimeter-wave (mmW) frequencies, within a 60 GHz frequency band, performed by a millimeter-wave (mmW) base station, the method comprising:
- configuring a large-aperture array antenna for multi-beam transmissions at mmW frequencies to a plurality of user equipment (UE);
- allocating each UE a non-interfering spectral portion of a full channel bandwidth that is substantially less than the full channel bandwidth, the full channel bandwidth being 2 GHz wide;
- determining a transmit power allocation for each UE for use within the allocated portion of bandwidth to increase power spectral density (PSD) for each UE within the allocated portion of bandwidth, the transmit power allocation based on a total transmit power (Pmax) limitation, a signal power density (Smax) limitation and a PSD limitation;
- performing multi-beam beamforming to concurrently direct a plurality of MU-MIMO antenna beams to the UEs for a concurrent transmission of data streams to the UEs within their allocated spectral portion in accordance with the transmit power allocation;
- instructing the UEs to refrain from utilizing the full channel bandwidth when allocating a non-interfering spectral portion; and
- communicating with the UEs within the allocated non-interfering spectral portion instead of the full channel bandwidth.

14. The method of claim 13 wherein allocating the non-interfering spectral portion of the full channel bandwidth reduces a signal bandwidth for each of the UEs to provide an increase the in PSD for each UE without exceeding the Pmax limitation, the SMax limitation the PSD limitation, and
- wherein the large-aperture array antenna has width and length dimensions that are at least ten times a wavelength of the mmW frequencies.

15. The method of claim 14 wherein the transmit power allocation for each UE is determined such that:
- a total of the transmit power allocations does not exceed the total transmit power limitation for the full channel bandwidth,
- a signal power density for transmissions by any of the antenna beams is below the signal power density limitation, and
- a PSD complies with a transmit spectral mask.

16. A millimeter-wave (mmW) base station comprising:
a large-aperture array antenna; and
a beamforming processor to configure the large-aperture array antenna for multi-beam transmissions at mmW frequencies, within a 60 GHz frequency band, to a plurality of user equipment (UE),
wherein the beamforming processor is arranged to:
allocate each UE a non-interfering spectral portion of a full channel bandwidth that is substantially less than the full channel bandwidth, the full channel bandwidth being 2 GHz wide;

instruct the UEs to refrain from utilizing the full channel bandwidth when allocated a non-interfering spectral portion;

determine a transmit power allocation for each UE for use within the allocated portion of bandwidth to increase power spectral density (PSD) for each UE within the allocated portion of bandwidth, the transmit power allocation based on a total transmit power (Pmax) limitation, a signal power density (Smax) limitation and a PSD limitation; and perform multi-beam beamforming to concurrently direct a plurality of multi-user multiple-input multiple-output (MU-MIMO) antenna beams to the UEs for a concurrent transmission of data streams to the UEs within their allocated non-interfering spectral portion in accordance with the transmit power allocation, wherein the mmW base station is arranged to communicate with the UEs within the allocated non-interfering spectral portion instead of the full channel bandwidth.

17. The mmW base station of claim 16 wherein the mmW base station is configurable to operate in accordance with a Wireless Gigabit Alliance (WiGig) specification.

18. A millimeter-wave (mmW) base station comprising:
a large-aperture array antenna; and
a beamforming processor to configure the large-aperture array antenna for multi-beam transmissions at mmW frequencies to a plurality of user equipment (UE),
wherein the beamforming processor is arranged to:
allocate each UE a non-interfering spectral portion of a full channel bandwidth that is substantially less than the full channel bandwidth;
instruct the UEs to refrain from utilizing the full channel bandwidth when allocated a non-interfering spectral portion;
determine a transmit power allocation for each UE; and
perform multi-beam beamforming to concurrently direct a plurality of multi-user multiple-input multiple-output (MU-MIMO) antenna beams to the UEs for a concurrent transmission of data streams to the UEs within their allocated non-interfering spectral portion in accordance with the transmit power allocation,
wherein the beamforming processor is arranged to:
allocate the non-interfering spectral portion of the full channel bandwidth to reduce a signal bandwidth for each of the UEs to provide an increase in power spectral density (PSD) for each UE without exceeding total transmit power (Pmax) limitation, a signal power density (Smax) limitation and a PSD limitation; and
determine the transmit power allocation for each UE such that:
a total of the transmit power allocations does not exceed the total transmit power limitation for the full channel bandwidth,
a signal power density for transmissions by any of the antenna beams is below the signal power density limitation, and
a PSD complies with a transmit spectral mask.

19. A non-transitory computer-readable storage medium that stores instructions for execution by one or more processors to perform operations for multi-user multiple-input multiple-output (MU-MIMO) beamforming, the operations to configure the one or more processors to:
configure a large-aperture array antenna for multi-beam transmissions at mmW frequencies, within a 60 GHz frequency band, to a plurality of user equipment (UE);
allocate each UE a non-interfering spectral portion of a full channel bandwidth that is substantially less than the full channel bandwidth, the full channel bandwidth being 2 GHz wide;
determine a transmit power allocation for each UE for use within the allocated portion of bandwidth to increase power spectral density (PSD) for each UE within the allocated portion of bandwidth, the transmit power allocation based on a total transmit power (Pmax) limitation, a signal power density (Smax) limitation and a PSD limitation;
configure the large-aperture array antenna to perform multi-beam beamforming to concurrently direct a plurality of MU-MIMO antenna beams to the UEs for a concurrent transmission of data streams to the UEs within their allocated spectral portion in accordance with a transmit power allocation;
instruct the UEs to refrain from utilizing the full channel bandwidth when allocated a non-interfering spectral portion; and
communicate with the UEs within the allocated non-interfering spectral portion instead of the full channel bandwidth.

20. A non-transitory computer-readable storage medium that stores instructions for execution by one or more processors to perform operations for multi-user multiple-input multiple-output (MU-MIMO) beamforming, the operations to configure the one or more processors to:
configure a large-aperture array antenna for ti-beam transmissions at mmW frequencies to a plurality of user equipment (UE);
allocate each UE a non-interfering spectral portion of a full channel bandwidth that is substantially less than the full channel bandwidth;
configure the large-aperture array antenna to perform multi-beam beamforming to concurrently direct a plurality of MU-MIMO antenna beams to the UEs for a concurrent transmission of data streams to the UEs within their allocated spectral portion in accordance with a transmit power allocation;
allocate the non-interfering spectral portion of the full channel bandwidth to reduce a signal bandwidth for each of the UEs to provide an increase in power spectral density (PSD) for each UE without exceeding total transmit power (Pmax) limitation, a signal power density (Smax) limitation and a PSD limitation; and
determine the transmit power allocation for each UE such that:
a total of the transmit power allocations does not exceed the total transmit power limitation for the full channel bandwidth,
a signal power density for transmissions by any of the antenna beams is below the signal power density limitation, and
a PSD complies with a transmit spectral mask.

* * * * *